(12) United States Patent
Ekanadham et al.

(10) Patent No.: US 8,484,422 B2
(45) Date of Patent: Jul. 9, 2013

(54) MAINTAINING DATA COHERENCE BY USING DATA DOMAINS

(75) Inventors: Kattamuri Ekanadham, Yorktown Heights, NY (US); Il Park, Yorktown Heights, NY (US); Pratap Pattnaik, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 12/633,428

(22) Filed: Dec. 8, 2009

(65) Prior Publication Data

US 2011/0138101 A1 Jun. 9, 2011

(51) Int. Cl.
*G06F 12/08* (2006.01)

(52) U.S. Cl.
USPC .......................................... 711/141; 711/148

(58) Field of Classification Search
None
See application file for complete search history.

(56) References Cited

U.S. PATENT DOCUMENTS

| | | | |
|---|---|---|---|
| 5,909,553 A | 6/1999 | Campbell et al. | |
| 6,085,295 A * | 7/2000 | Ekanadham et al. | 711/145 |
| 7,146,489 B2 | 12/2006 | Dowling | |
| 7,194,517 B2 * | 3/2007 | Conway et al. | 709/212 |
| 2004/0083284 A1 | 4/2004 | Ofek et al. | |
| 2005/0005074 A1 | 1/2005 | Landin et al. | |
| 2007/0106850 A1* | 5/2007 | Dai et al. | 711/141 |
| 2008/0082756 A1 | 4/2008 | Shen | |

FOREIGN PATENT DOCUMENTS

JP 2007160922 6/2007

OTHER PUBLICATIONS

Leung, H. K. Y. et al., "Efficient Matching for State-Persistent Publish/Subscribe Systems" IBM Centre for Advanced Studies Conference (2003) pp. 182-196.
Mattos, N. M., "Integrating Information for on Demand Computing" Proceedings of the 29th International Conference on Very Large Data Bases (2003) pp. 8-14, vol. 29.
Phan, X. H. et al., "Learning to Classify Short and Sparse Text and Web with Hidden Topics from Large-scale Data Collections" ACM Transactions on Asian Language Information Processing (TALIP) (2009) pp. 91-100, vol. 8(3).

* cited by examiner

*Primary Examiner* — Than Nguyen
(74) *Attorney, Agent, or Firm* — Scully, Scott, Murphy & Presser, P.C.; Eustus D. Nelson, Esq.

(57) ABSTRACT

A method, system and computer program product are disclosed for maintaining data coherence, for use in a multi-node processing system where each of the nodes includes one or more components. In one embodiment, the method comprises establishing a data domain, assigning a group of the components to the data domain, sending a coherence message from a first component of the processing system to a second component of the processing system, and determining if that second component is assigned to the data domain. In this embodiment, if that second component is assigned to the data domain, the coherence message is transferred to all of the components assigned to the data domain to maintain data coherency among those components. In an embodiment, if that second component is assigned to the data domain, the first component is assigned to the data domain.

20 Claims, 4 Drawing Sheets

PORTS, DOMAINS AND DOMAIN TABLE

DOMAIN ASSIGNMENT AND USAGE

SYSTEM OF 4 NODES

MAINTAINING DATA COHERENCE BY USING DATA DOMAINS

BACKGROUND OF THE INVENTION

1. Field of the Invention

This invention generally relates to data processing systems, and more specifically, to maintaining data coherence in multi-node data processing systems.

2. Background Art

Large-scale shared memory multi-processor computer systems typically have a large number of processing nodes (e.g., with one or more microprocessors and local memory) that cooperate to perform a common task. For example, selected nodes on a multi-processor computer system may cooperate to multiply a complex matrix. To do this in a rapid and efficient manner, such computer systems typically divide the task into discrete parts that each are executed by one or more of the nodes.

When dividing a task, the nodes often share data. To that end, the microprocessors within the nodes each may access the memory of many of the other nodes. Those other microprocessors could be in the same node, or in different nodes. For example, a microprocessor may retrieve data from the memory of another node. Also, rather than retrieving the data from another node each time the data is needed, a microprocessor may store and access its locally held copies (cached copies) of data to perform local functions.

Problems may arise, however, when the data that held by one microprocessor changes, and another microprocessor that uses the data has not been notified of the change. When that happens, the locally held data may no longer be accurate, potentially corrupting operations that rely upon the retrieved data. To mitigate these problems, computer systems that share data in this manner typically execute cache coherency protocols to ensure that all copies of the data are consistent.

As data processing systems grow larger, operations for maintaining system-wide coherence incur larger latencies as these operations involve round-trips to all units participating in the coherence mechanism. Modern systems employ optimization schemes to limit the propagation of coherence traffic to a subset of units, wherever it is possible to detect that it is sufficient to limit the coherence check to that Subset. A simple example is node pumping in a large system comprised of several nodes, where if a node can detect that a certain line is currently confined to caches within that node, then it is sufficient to send an invalidation message only to caches within that node, in order to gain exclusive access to that line. Often such tracking is complex and tends to be speculative.

BRIEF SUMMARY

The central activity in a computing system is the movement of data among the various components. Consequently, system performance is intimately tied to the manner in which data movements are orchestrated. Embodiments of the invention utilize a mechanism, referred to as Data Domain, that tracks movement of data within a set of components associated with the domain. Embodiments of the invention provide domain controls which can be used by system software to (a) reduce unnecessary coherence traffic in the systems, (b) co-locate producers and consumers of shared data in close proximity, and (c) automate auxiliary operations on data, such as compression, encryption, mirroring.

Embodiments of the invention provide a method, system and computer program product for maintaining data coherence, for use in a multi-node processing system. Each of the nodes includes one or more components. In one embodiment, the method comprises establishing a data domain, assigning a group of said components to the data domain, sending a coherence message from one of the components of the multi-node processing system to another of the components of the multi-node processing system, and determining if said another of the components is assigned to the data domain. In this embodiment, if said another of the components is assigned to the data domain, said coherence message is transferred to all of the components assigned to the data domain to maintain data coherency among said all of the components.

In an embodiment, if said another of the components is assigned to the data domain, the method further comprises assigning said one of the components to the data domain. In an embodiment, the method further comprises, if said another of the components is not assigned to the data domain, establishing a new data domain and assigning said another of the components to said new data domain.

In one embodiment, the sending includes obtaining an address for the data in said another of the components, and the determining includes determining if said address is assigned to the data domain. In an embodiment, the address is associated to a memory location referred by a processor with a domain that includes that processor as well as the memory bank supporting that address, and this association is made during an address translation time and can be remembered in tables or other apparatus used to implement address translation in the processing system.

In an embodiment, the transferring said coherence message to all of the components assigned to the data domain includes transferring said coherence message only to said all of the components assigned to the data domain to reduce data coherence traffic in the processing system. In one embodiment, the method further comprises co-locating or rescheduling operations of the components to reduce the number of nodes having components assigned to the data domain. For example, in an embodiment, a plurality of components on a first node are assigned to the data domain, and at least one component on a second node is assigned to the data domain. In this example, said co-locating or rescheduling includes rescheduling operations of said at least one component to one of the components of the first node.

In an embodiment, the method further comprises identifying one or more actions to be performed on data moving to any of the components assigned to the data domain. In one embodiment, the establishing includes establishing a domain table for the data domain, and the domain table identifies all of the components assigned to the data domain. In an embodiment, the domain table identifies said one or more actions to be performed on the data moving to any of the components assigned to the data domains.

One or more embodiments of the invention provide a means of dynamically creating domains, a domain being a set of components, a component being either a processor port or a memory port; a means of dynamically changing existing domains, by adding/removing components to/from a domain, and allowing the possibility of a component to be present in multiple domains at the same time; and a means to uniquely identify a domain in the system.

One or more embodiments of the invention provide a means for a processor port to submit a message, tagged with a domain identification; a means to maintain coherence within a domain, which means that whenever a message with a domain id is submitted, the message will be delivered to all components in that domain and need not be seen by components outside that domain; and a means to associate a domain with auxiliary functions performed on a message being communicated in a domain, examples of functions being encryption/decryption, compression/decompression or mirroring (which means a copy of the message is automatically stored at another specified memory component).

One or more embodiments of the invention provide a method to associate the address to a memory location referred by a process with a domain that includes that processor as well as the memory bank supporting that address and this association is made during the address translation time and can be remembered in the tables or other apparatus used to implement address translation in a computer system; and a method for the communication subsystem to maintain the domain table, associating components and domains, so that each message tagged with a domain id can be delivered to all the components of that domain.

One or more embodiments of the invention provide a method to keep the above domain table consistent, as changes are made to domains dynamically; a method for the communication subsystem to implement the auxiliary functions associated with a domain; a method for memory allocation manager to consult the domain map, so that the newly allocated memory is conveniently located to reduce the latency of communication within a domain; and a method for process scheduler manager to consult the domain map, so that processes are scheduled on processors to reduce the latency of their memory accesses.

DETAILED DESCRIPTION

Figure 1:
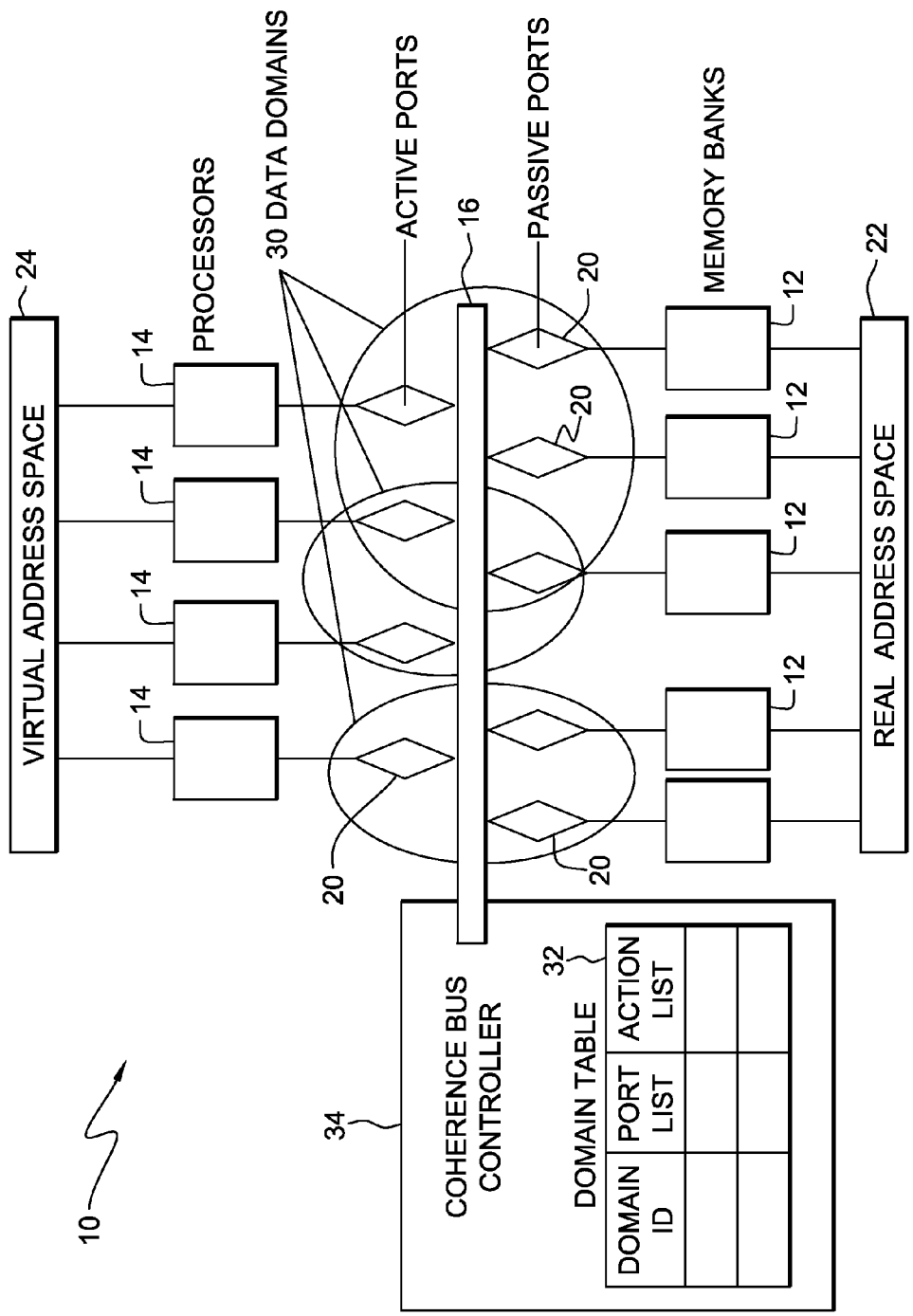
FIG. 1 shows a collection of data processing components, a plurality of data domains, and a domain table in accordance with an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention provide a method, system and computer program product for maintaining data coherence, for use in a multi-node processing system. Each of the nodes includes one or more components. Consider, as an example, shown in FIG. 1, a system 10, which is a collection of components, each component being either a memory bank 12, that stores data, or a processor 14, that produces and consumes data. In this example, each independently running thread in the hardware is considered as a processor. It may internally have a layer of caches, and this invention is not specifically concerned with details of the internal movement of data between a processor and its caches. All the components are connected to some logical bus 16, which implements transactions to enforce coherence of data. Each component is connected to the bus through a port 20, which implements a coherence protocol. Any suitable coherence protocol may be used, and a number of common coherence protocols are well known in the literature.

The term data movement is used to refer to movement of any data either (a) between a processor 14 and memory 12 or (b) between two processors 14. A data movement is always initiated by some processor. Memory banks 12 are passive and either receive or supply the requested data. Hence, the ports connected to processors 14 are called active and ports connected to the memory 12 are called passive. A data movement is always between a pair of ports 20, at least one of which is active. Every data movement is uniquely identified by its real address, and the real address space 22 is partitioned by the memory banks, All processors refer to the data using addresses from the virtual address space 24, which is translated into real address space by system software, usually using tables known as TLBs.

A data domain 30 is an entity uniquely identified by a data domain id. In embodiments of the invention, data domains 30 are allocated and managed by the system software, and each domain is associated with a list of ports 20 and a list of actions. The system software controls the data movements using these domains. Each data movement in the system is assigned a unique domain id by the system software, with the implication that only the ports 20 listed for that domain need to participate in the coherence protocol for that data movement. Furthermore, when the data movement takes place, auxiliary actions specified for that domain will be performed on the data. Actions are implementation-dependent and specify the necessary parameters and conditions under which an action must be performed on the data. Examples of actions are compression/decompression, encryption/decryption and mirroring. All the information pertaining to a domain is conveniently stored in a domain table 32, which can be indexed by the domain id. A copy of the domain table is made available to the coherence bus controller 34, as shown in FIG. 1. The system software, which dynamically updates the table 32, is responsible to keep the copy of the table in the coherence controller up-to-date. The controller 34, which implements the coherence protocol, uses the table 32 for routing coherence transactions to the relevant ports 20 and also to perform the necessary actions on the data during the data movement.

Figure 2:
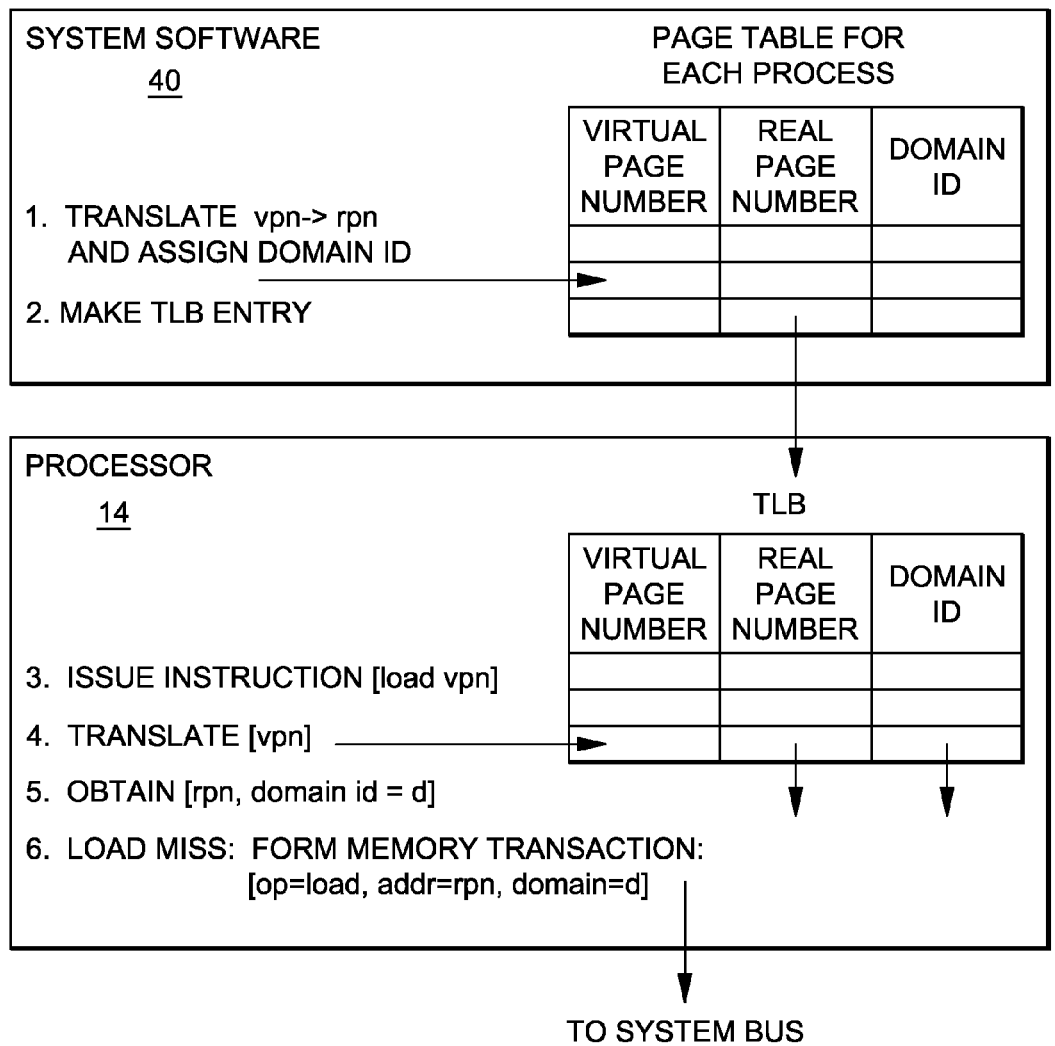
FIG. 2 illustrates procedures for assigning and obtaining domain ids.
Figure 3:
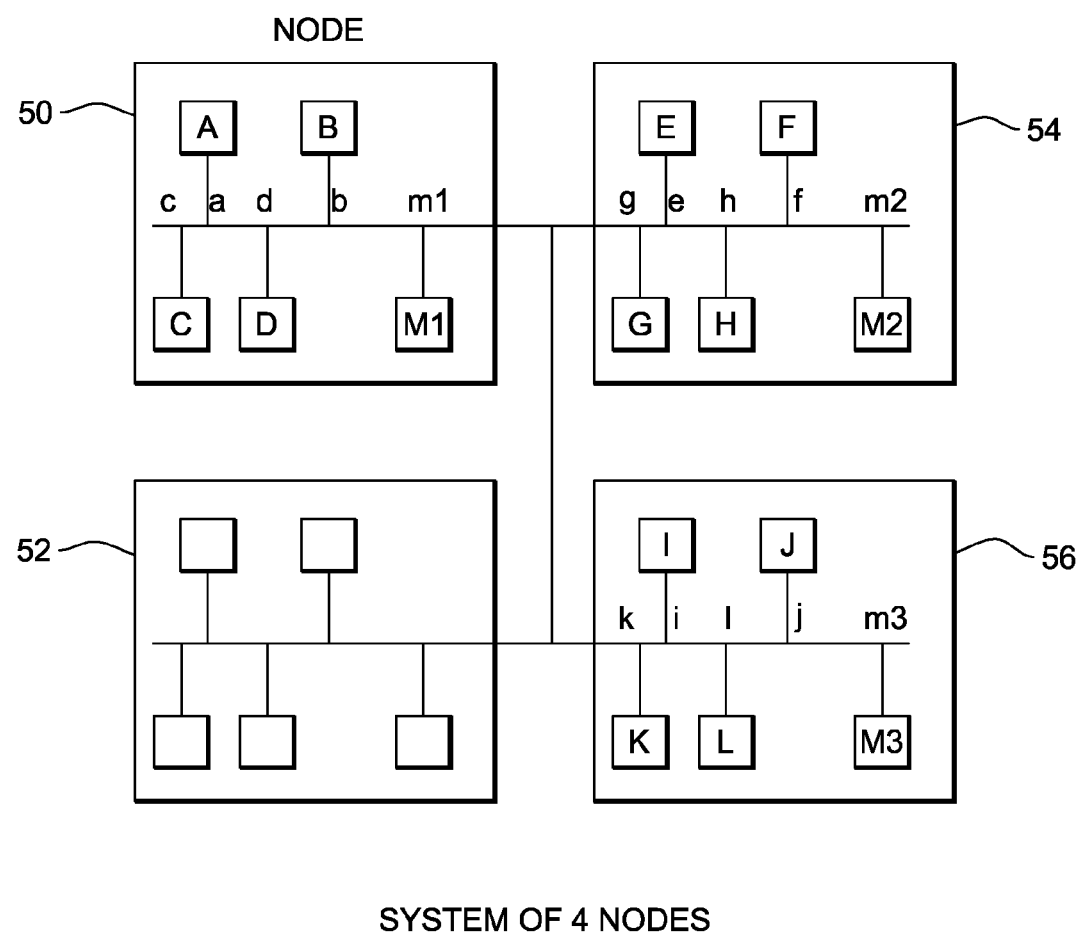
FIG. 3 shows examples of the use of a data domain in accordance with embodiments of the invention.

The data Domain 30 are used to control the data movement. Two factors affect data movement: address mapping and process scheduling. In embodiments of the invention, both of these are controlled by system software and manifest when a TLB entry is created. Any program asking for the data movement must consult its TLB entry, and the other ports involved in the data movement will be included in the port list associated with the domain. Hence, with reference to FIG. 2, it is convenient for the system software 40 to do the domain assignment when the system software sets up a TLB entry 42. Each time another processor 14 is set up with a translation for the same real address, that processor's port name will be added to the port list of the domain, thereby confining the coherence transactions related to that data to that subset of ports. Since any processor must first obtain a translation before accessing the data, the processor can obtain the corresponding domain id for that data and submit that domain id along with the processor's request to the bus controller 34.

Figure 4:
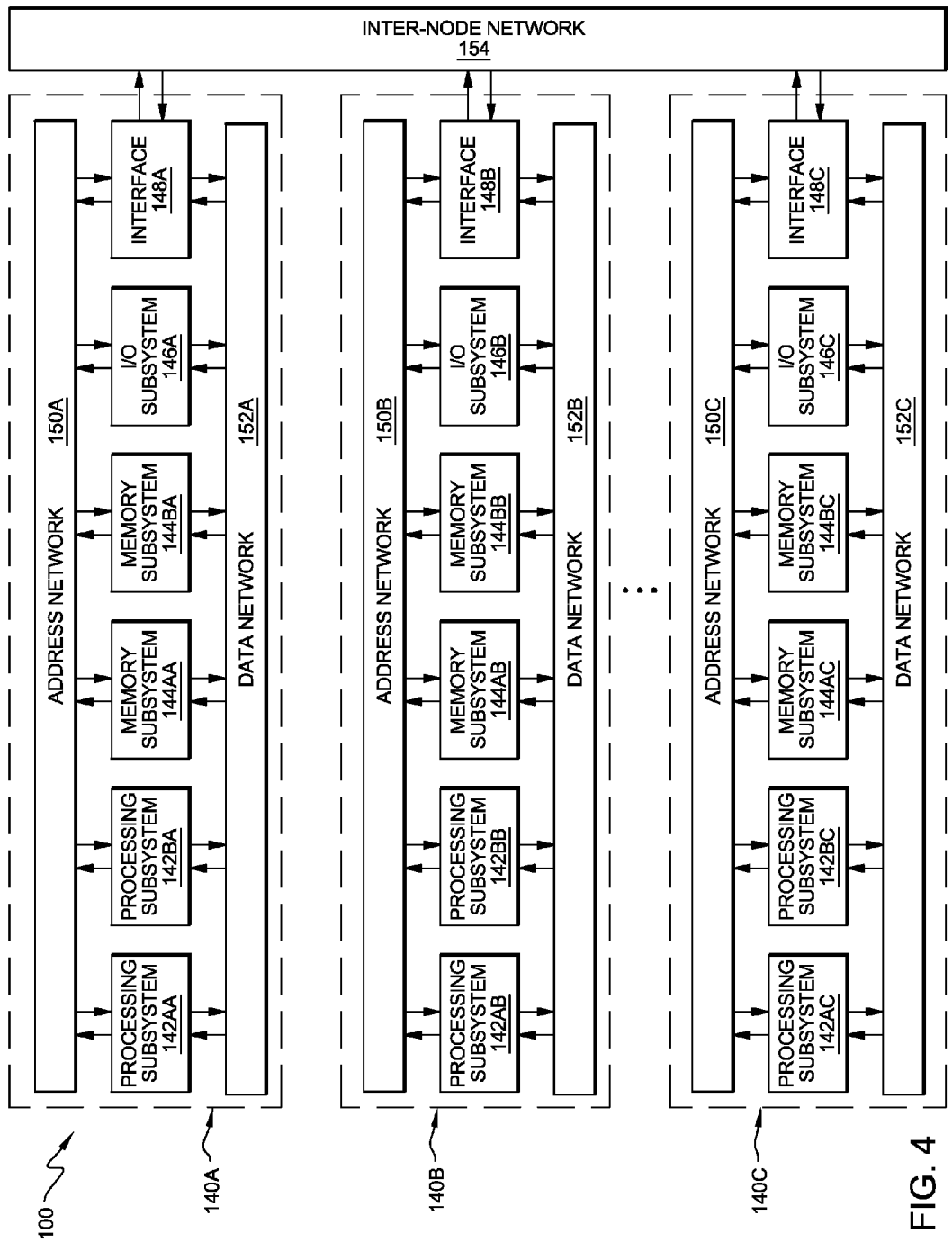
FIG. 4 depicts a data processing system in which the present invention may be embodied.

As mentioned earlier, there are three principal uses for the concept of domain and each of these principals is discussed below. Consider, as shown in FIG. 4, a system of 4 nodes 50, 52, 54, 56, where each node has 4 processors and a memory bank. All the memory banks and processors are connected over a logical bus 60 and, in this example, access latency increases when a node boundary is crossed.

(a) Reduction of Unnecessary Coherence Traffic in the System.

Suppose a program runs over processors A,B and H and accesses locations in memory bank Ml, then a single domain can be set up for all their accesses and the port list will contain {a,b,h,m1}. All coherence traffic for these accesses are confined into the four listed ports and so, all unnecessary traffic into the unlisted ports is avoided.

(b) Co-location of Program and Data.

The performance of the above example can be improved by rescheduling the program on H to C. The port list will be changed to {a,b,c,m1}. Therefore, all coherence traffic will be confined into a single node. As a result, the system is able to not only reduce the coherence traffic but also reduce the latency. Alternatively, shifting programs from A and B to F and G and remapping data from M1 to M2 will achieve the same effect. This will involve copying data from M1 to M2. All this information is available to the system software through the domain table, and suitable choices can be made depending on the situation.

(c) Automation of Auxiliary Operations on Data.

Embodiments of the invention also enable automation of auxiliary operations on data. These operations can be used to achieve a number of objectives. As one example, these auxiliary operations can be used to keep a mirror image of M1 in M3. To do this in the above example, a domain action will specify that all writes into M1 are to be mirrored into M3. The port list will remain the same, ensuring all coherence traffic will remain within the node. Data gets mirrored automatically, without having to have additional software to do extra loads and stores.

FIG. 4 illustrates a multi-node processing system 100 in which embodiments of the invention may be implemented. FIG. 4 shows three nodes 140A-140C (collectively referred to as nodes 140), and each node includes several client devices. For example, node 140A includes processing subsystems 142AA and 142AB, memory subsystems 144AA and 144AB, I/O subsystem 146A, and interface 148A. The client devices in node 140A share address network 150A and data network 152A. In the illustrated embodiment, nodes 140B and 140C contain similar client devices (identified by reference identifiers ending in "B" and "C" respectively). Note that different nodes may include different numbers of and/or types of client devices, and that some types of client devices may not be included in some nodes.

As used herein, a node is a group of client devices (e.g., processing subsystems 142, memory subsystems 144, and/or I/O subsystems 146) that share the same address and data networks. By linking multiple nodes, the number of client devices in the processing system 100 may be adjusted independently of the size limitations of any individual node 140. Although three nodes are depicted in FIG. 4, it is understood that more nodes can be included in the system 100.

Each node 140 communicates with other nodes in processing system 100 via an interface 148 (interfaces 148A-148C are collectively referred to as interfaces 148). Some nodes may include more than one interface. Interfaces 148 may communicate by sending packets of address and/or data information on inter-node network 154. Each of processing subsystems 142 and I/O subsystem 146 may access memory subsystems 144. Each client in FIG. 4 may be configured to participate in the coherency protocol by sending address messages on address network 150 and data messages on data network 152 using split-transaction packets.

Memory subsystems 144 are configured to store data and instruction code for use by processing subsystems 142 and I/O subsystem 146. Memory subsystems 144 may include dynamic random access memory (DRAM), although other types of memory may be used in some embodiments. I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Messages upon data network 152 are referred to herein as data packets. Note that in some embodiments, address network 150 and data network 152 may be implemented using the same physical interconnect.

Address network 150 accommodates communication between processing subsystems 142, memory subsystems 144, and I/O subsystem 146. Messages upon address network 150 are generally referred to as address packets. In some embodiments, address packets may correspond to requests for an access right (e.g., a readable or writable copy of a cacheable coherency unit) or requests to perform a read or write to a non-cacheable memory location. Address packets may be sent by a device in order to initiate a coherency transaction. Subsequent address packets may be sent by other devices in order to implement the access right and/or ownership changes needed to satisfy the coherence request.

In the processing system 100 shown in FIG. 4, a coherency transaction may include one or more packets upon address network 150 and data network 152. Typical coherency transactions involve one or more address and/or data packets that implement data transfers, ownership transfers, and/or changes in access privileges. If activity within more than one node 140 is needed to complete a coherency transaction, that coherency transaction may also involve one or more packets on inter-node network 154.

Various devices such as I/O subsystems 146 and/or processing subsystems 142 may be configured to access data in any node 140 within processing system 100. Several different address spaces may be used to describe the data stored in processing system 100. Virtual addresses, which may be generated within each processing device while executing program instructions, may form one address space. A global address space may include addresses that identify each unique coherency unit stored within any of the nodes in processing system 100, allowing a device in one node to identify data stored in another node. Local physical address space may be unique to each node and contains the physical addresses that are used to access coherency units within the local memory of each node. The local memory of each node includes the memory included in the memory subsystem(s) 144 in that node 140.

Active devices within each node 140 may be configured to use global addresses to specify data when sending address packets in coherency transactions. An active device in one node 140A may access data in another node 14013 by sending an address packet specifying the data's global address. The memory subsystems 144 may translate a global address received in an address packet to a local physical address and use that local physical address to access the specified coherency unit.

Thus, methods, systems, and computer program products for maintaining cache coherence using data domains have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of maintaining data coherence for use in a multi-node processing system, the method comprising:
    establishing a data domain in a multi-node processing system, each of the nodes including one or more components;
    assigning a group of said components to the data domain;
    sending a coherence message from one of the components of the multi-node processing system to another of the components of the multi-node processing system;
    determining if said another of the components is assigned to the data domain; and
    if said another of the components is assigned to the data domain, transferring said coherence message to all of the components assigned to the data domain to maintain data coherency among said all of the components assigned to the data domain.

2. The method according to claim 1, further comprising, if said another of the components is assigned to the data domain, assigning said one of the components to the data domain.

3. The method according to claim 1, wherein if said another of the components is not assigned to any of the data domain, establishing a new data domain and assigning said another of the components to said new data domain.

4. The method according to claim 1, wherein:
    the sending includes obtaining an address for the coherence message in said another of the components; and
    the determining includes determining if said address is assigned to the data domain.

5. The method according to claim 1, wherein:
    an address is associated to a memory location referred by a processor with a domain that includes that processor as well as a memory bank supporting that address, and this association is made during an address translation time and can be remembered in tables or other apparatus used to implement address translation in the processing system.

6. The method according to claim 1, wherein the transferring said coherence message to all of the components assigned to the data domain includes transferring said coherence message only to said all of the components assigned to the data domain to reduce data coherence traffic in the processing system.

7. The method according to claim 1, further comprising co-locating operations of the components to reduce the number of nodes having components assigned to the data domain.

8. The method according to claim 7, wherein a plurality of components on a first node are assigned to the data domain, and at least one component on a second node is assigned to the data domain, and said co-locating operations of the components includes rescheduling operations of said at least one component to one of the components of the first node.

9. The method according to claim 1, further comprising identifying one or more actions to be performed on data moving to any of the components assigned to the data domain.

10. The method according to claim 9, wherein:
the establishing includes establishing a domain table for the data domain;
the domain table identifies all of the components assigned to the data domain; and
the domain table identifies said one or more actions.

11. A data coherence system for maintaining data coherence for use in a multi- node processing system, the data coherence system comprising one or more processing units in said processing system configured for:
establishing a data domain in a multi-node processing system, each of the nodes including one or more components;
assigning a group of said components to the data domain;
sending a coherence message from one of the components of the multi-node processing system to another of the components of the multi-node processing system;
determining if said another of the components is assigned to the data domain; and
if said another of the components is assigned to the data domain, transferring said coherence message to all of the components assigned to the data domain to maintain data coherency among said all of the components.

12. The system according to claim 11, further comprising, if said another of the components is assigned to the data domain, assigning said one of the components to the data domain.

13. The system according to claim 11, further comprising:
a means for dynamically changing existing domains, by adding/removing components to/from a domain, and enabling a component to be present in multiple domains at the same time;
means for a processor port to submit a message, tagged with a domain identification; and
means to associate a domain with auxiliary functions performed on a message being communicated in a domain.

14. The system according to claim 11, wherein the system is able to create a new domain, for a component, even if the component is currently a member of another domain.

15. The system according to claim 11, wherein the transferring said coherence message to all of the components assigned to the data domain includes transferring said coherence message only to said all of the components assigned to the data domain to reduce data coherence traffic in the processing system.

16. A method of maintaining data coherence for use in a multi-node processing system, the method comprising:
establishing first and second data domains in a multi-node processing system, each of the nodes including one or more components;
assigning a first set of said components of the multi-node processing system to the first data domain, and assigning a second set of components of the multi-node processing system;
sending a coherence message from one of the components of the multi-node processing system to another of the components of the multi-node processing system;
determining if said another of the components is assigned to one of the data domains; and
if said another of the components is assigned to the first data domain, transferring said coherence message to all of the components assigned to the first data domain to maintain data coherency among the components assigned to the first data domain.

17. The method according to claim 16, wherein:
the sending includes obtaining an address for the coherence message in said another of the components; and
the determining includes determining if said address is assigned to one of the data domains.

18. The method according to claim 16, wherein:
at least one of the components is assigned to the first and the second data domains;
the sending includes sending the coherence message to said at least one of the components;
the determining includes identifying one of the data domains to be updated; and
the transferring includes transferring said coherence message to all of the components assigned to the identified one of the data domains.

19. The method according to claim 16, wherein the transferring said coherence message to all of the components assigned to the first data domain includes transferring said coherence message only to said all of the components assigned to the first data domain to reduce data coherence traffic in the processing system.

20. The method according to claim 16, further comprising co-locating operations of the components to reduce the number of nodes having components in the first data domain.

* * * * *